United States Patent
Jo et al.

(10) Patent No.: US 7,709,791 B2
(45) Date of Patent: May 4, 2010

(54) SCANNING PROBE MICROSCOPE WITH AUTOMATIC PROBE REPLACEMENT FUNCTION

(75) Inventors: Hyeong Chan Jo, Suwon (KR); Hong Jae Lim, Suwon (KR); Seung Jun Shin, Seoul (KR); Joon Hui Kim, Seoul (KR); Yong Seok Kim, Seoul (KR); Sang-il Park, Seongnam (KR)

(73) Assignee: Park Systems Corp., Suwon (KR)

( * ) Notice: Subject to any disclaimer, the term of this patent is extended or adjusted under 35 U.S.C. 154(b) by 151 days.

(21) Appl. No.: 11/872,614

(22) Filed: Oct. 15, 2007

(65) Prior Publication Data
US 2008/0149829 A1    Jun. 26, 2008

(30) Foreign Application Priority Data
Dec. 21, 2006    (KR) .................... 10-2006-0132038

(51) Int. Cl.
*G01N 23/00* (2006.01)
*G21K 7/00* (2006.01)

(52) U.S. Cl. ........................ 250/306; 250/307; 250/234; 250/201.3; 250/442.11; 250/492.3; 250/252.1; 850/1; 850/9; 850/12; 850/19; 850/26; 850/37; 850/46; 850/53; 850/55; 850/2; 850/3; 850/4; 850/5; 73/105; 73/866.5; 359/395

(58) Field of Classification Search ................. 250/306, 250/307, 234, 201.3, 442.11, 492.3, 252.1; 850/1–5, 9, 12, 19, 26, 37, 46, 53, 55; 73/105, 73/866.5; 359/395
See application file for complete search history.

(56) References Cited

U.S. PATENT DOCUMENTS

| 4,935,634 A | * | 6/1990 | Hansma et al. | ........ 250/559.23 |
| 5,705,814 A | * | 1/1998 | Young et al. | .................... 850/2 |

\* cited by examiner

*Primary Examiner*—Nikita Wells
*Assistant Examiner*—Meenakshi S Sahu
(74) *Attorney, Agent, or Firm*—Patterson & Sheridan, LLP

(57) ABSTRACT

Provided is a scanning probe microscope (SPM), a probe of which can be automatically replaced and the replacement probe can be attached onto an exact position. The SPM includes a first scanner that has a carrier holder, and changes a position of the carrier holder in a straight line; a second scanner changing a position of a sample on a plane; and a tray being able to store a spare carrier and a spare probe attached to the spare carrier. The carrier holder includes a plurality of protrusions.

20 Claims, 4 Drawing Sheets

SCANNING PROBE MICROSCOPE WITH AUTOMATIC PROBE REPLACEMENT FUNCTION

CROSS-REFERENCE TO RELATED PATENT APPLICATIONS

This application claims the benefit of Korean Patent Application No. 10-2006-0132038, filed on Dec. 21, 2006, in the Korean Intellectual Property Office, the disclosure of which is incorporated herein in its entirety by reference.

BACKGROUND OF THE INVENTION

1. Field of the Invention

The present invention relates to a scanning probe microscope, a probe of which can be automatically replaced, and more particularly, to a scanning probe microscope, a probe of which can be automatically replaced and the replacement probe can be attached to an exact position.

2. Description of the Related Art

Scanning probe microscopes (SPMs) are microscopes having a resolution in the nano-scale range, and show surfaces of samples or electrical properties of the samples as images. Some examples of SPMs are atomic force microscopes (AFMs), magnetic force microscopes (MFMs), and scanning capacitance microscopes (SCMs).

In a conventional SPM, a tip of a probe moves while contacting a surface of a sample or moves while maintaining a predetermined distance from the surface of the sample in order to analyze the shape of the surface of the sample or the electrical properties of the sample. As described above, since the tip of the probe in the conventional SPM moves while contacting the surface of the sample or maintaining a constant distance from the surface of the sample, the probe or the tip of the probe can be damaged when the conventional SPM operates. Therefore, the probe of the conventional SPM is fabricated in order for the probe to be replaced.

However, in the conventional SPM, the tip of the probe must be manually replaced by a user, and thus, it is inconvenient to do so. Additionally, since the conventional SPM represents properties of the surface of the sample using the tip of a few micrometers or a few nanometers in size as images, the replacement probe must be attached onto an exact position. However, in the conventional SPM, the position of the tip of the probe is changed whenever the probe is replaced, and thus, the positions of optical systems related to the probe must be rearranged after replacing the probe.

SUMMARY OF THE INVENTION

The present invention provides a scanning probe microscope (SPM), in which a probe is automatically replaced and the replacement probe is attached onto an exact position.

According to an aspect of the present invention, there is provided a scanning probe microscope (SPM) including: a first scanner that has a carrier holder, and changes a position of the carrier holder in a straight line; a second scanner changing a position of a sample on a plane; and a tray being able to store a spare carrier and a spare probe attached to the spare carrier, wherein the carrier holder includes a plurality of protrusions.

The SPM may further include: a carrier and a probe attached to the carrier, and the carrier may be attached onto the carrier holder and detached from the carrier holder and may include a plurality of holes corresponding to the protrusions of the carrier holder.

The tray may include a plurality of protrusions.

The SPM may further include: a carrier and a probe attached to the carrier, and the carrier may be attached onto the carrier holder and detached from the carrier holder and may include a plurality of holes or recesses corresponding to the protrusions of the carrier holder and a plurality of holes or recesses corresponding to the protrusions of the tray.

The carrier may be formed of metal.

The carrier holder may be formed of a permanent magnet or an electromagnet, may include a portion formed of a permanent magnet or an electromagnet, or include a vacuum chuck.

The tray may be formed of a permanent magnet or an electromagnet, or may include a portion formed of a permanent magnet or an electromagnet.

The carrier holder may include three protrusions that are hemispherical.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to accompanying drawings.

Figure 1:
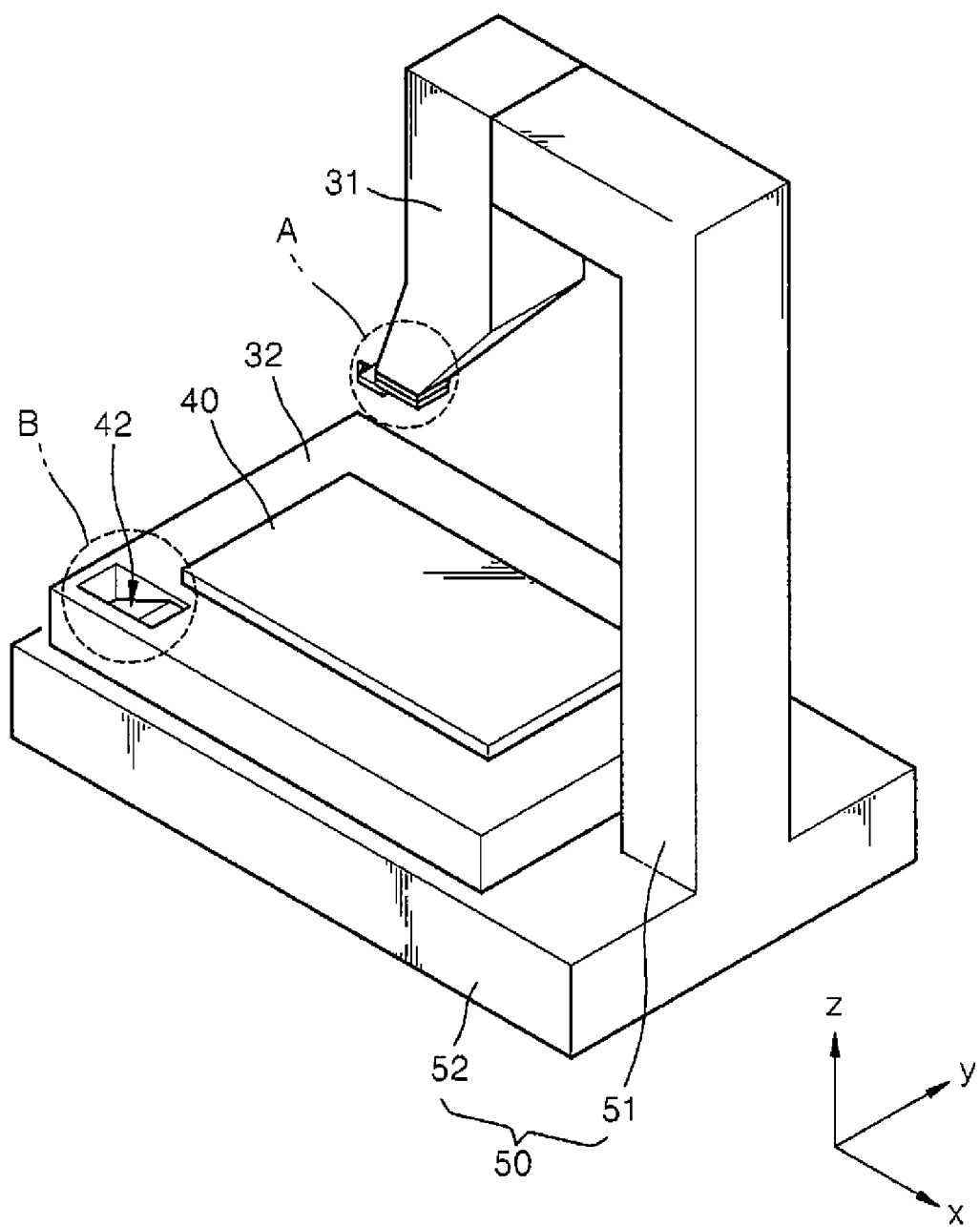
FIG. 1 is a schematic perspective view of a scanning probe microscope (SPM) according to an embodiment of the present invention.

FIG. 1 is a schematic perspective view of a scanning probe microscope (SPM) according to an embodiment of the present invention. Referring to FIG. 1, the SPM according to the current embodiment includes a first scanner 31, a second scanner 32, and a tray 42 that stores a spare probe. If necessary, the SPM can further include a frame 50 that includes a first frame 51 supporting the first scanner 31 and a second frame 52 supporting the second scanner 32, as shown in FIG. 1. Additionally, a position of the tray 42 is not limited to the position shown in FIG. 1, and thus, the position of the tray 42 can be located on various other locations of the SPM.

The first scanner 31 includes a carrier holder 30 (refer to FIG. 2A) on an end portion thereof, and moves the carrier holder 30 in a straight line in a z-axis direction. Hence, when a carrier 20, to which the probe is attached, is attached to the carrier holder 30, the first scanner 31 moves the probe in the straight line in the z-axis direction. The second scanner 32 changes a position of a sample 40 on an x-y plane.

Figure 2A:
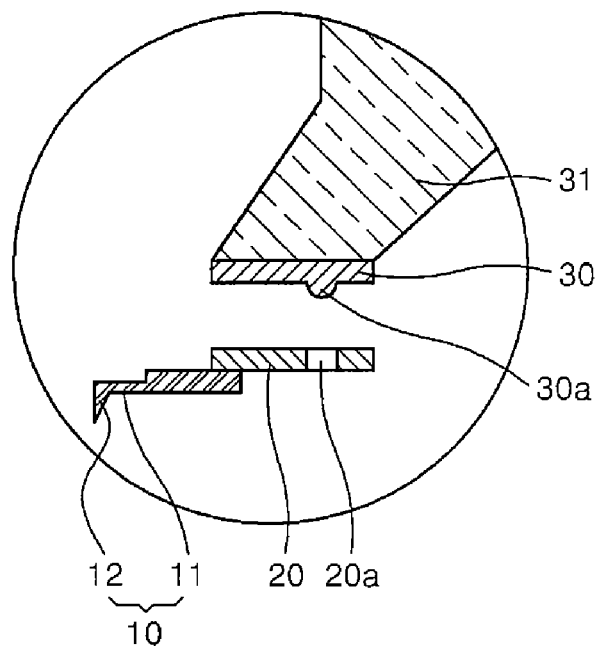
FIG. 2A is a cross-sectional side view of portion A of FIG. 1, according to an embodiment of the present invention.
Figure 2B:
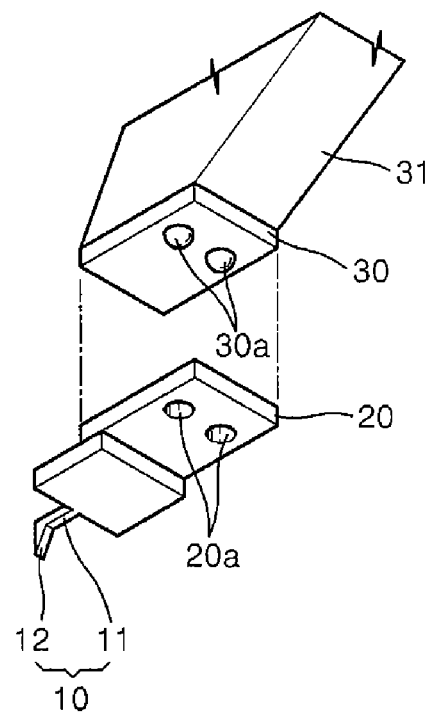
FIG. 2B is an exploded perspective view of portion A of FIG. 1, according to an embodiment of the present invention.

FIG. 2A is a schematic cross-sectional view of portion A in FIG. 1, and FIG. 2B is an exploded perspective view of portion A in FIG. 1, according to embodiments of the present invention. Referring to FIG. 1 and FIG. 2B, the carrier holder 30 includes a plurality of protrusions 30a. In FIGS. 2A and 2B, two protrusions 30a are disposed.

The carrier 20 can be attached onto the carrier holder 30, and the probe 10 is adhered onto the carrier 20. The probe 10 includes a cantilever 11 and a tip 12 on an end of the cantilever 11, and is generally formed as a semiconductor chip. The chip is generally 1.6 mm in width and 3.4 mm in length. The cantilever 11, having a length of about 100 μm, is exposed from a side of the chip, and the tip 12 is formed on the end of the cantilever 11. In the current embodiment and other embodiments of the present invention, the probe 10 is defined to include the semiconductor chip, the cantilever 11, and the tip 12, for the convenience of explanation. Since the probe 10 is very small, the probe 10 is attached onto the carrier 20 in order for the probe 10 to be easily manipulated. The probe 10 can be attached to the carrier 20 using an adhesive or various other methods. In FIGS. 2A and 2B, parts of the probe 10 and the carrier 20 are not drawn to actual scale, and the parts of the probe 10 and the carrier 20 are schematically disclosed for convenience of explanation.

As described above, in the SPM of the current embodiment, the carrier holder 30, which is formed on the end portion of the first scanner 31, includes the protrusions 30a. Additionally, the carrier 20, on which the probe 10 is attached, includes a plurality of holes 20a that correspond to the protrusions 30a of the carrier holder 30. Alternatively, a plurality of recesses, not the holes 20a as shown in FIGS. 2A and 2B, can be formed, and the recesses can correspond to the protrusions 30a formed on the carrier holder 30 at the end portion of the first scanner 31. In this case, the recesses may not be formed as spheres, however, can be formed as various shapes, such as slots. Hereinafter, the case where the holes 20a are formed in the carrier 20 will be described.

The carrier 20, on which the probe 10 is attached, is adhered onto the carrier holder 30 on the end portion of the first scanner 31. The carrier 20 is formed of a metal material. In addition, the carrier holder 30 can be formed of a permanent magnet or an electromagnet, or can have portions of the carrier holder 30 formed of the permanent magnet or the electromagnet, for example, the protrusions 30a. Therefore, the carrier 20 is attached onto the carrier holder 30 using electromagnetic forces. When the carrier 20, to which the probe 10 is attached, is detached from the carrier holder 30, the user can easily manually remove the carrier 20. Additionally, if the carrier holder 30 is formed of an electromagnet or has a portion formed of an electromagnet, the carrier 20 can be attached to or detached from the carrier holder 30 automatically using the properties of electromagnets. Further, the carrier holder 30 can have a vacuum chuck, and an adhesion force of the carrier holder 30 can be controlled by controlling the suction force of the vacuum chuck, and accordingly, the carrier 20 can be attached to or detached from the carrier holder 30.

According to the SPM of the current embodiment, when the probe 10 or the carrier 20, to which the probe 10 is attached, attached to the carrier holder 30 at the end portion of the first scanner 31, needs to be replaced, the end portion of the first scanner 31 moves to an upper portion of the tray 42 (refer to FIG. 1), and then, the spare probe (or a spare carrier to which the spare probe is attached) stored in the tray 42 is attached to the carrier holder 30, which is at the end portion of the first scanner 31. Before this operation, the probe 10 that was used is detached from the carrier holder 30, which is at the end portion of the first scanner 31. Additionally, although the end portion of the first scanner 31 is depicted not to be able to move to the upper portion of the tray 42 in FIG. 1, this is just for the convenience of depiction, and an actuator that can change the position of the first scanner 31 can be further formed on the first frame 51 that supports the first scanner 31. Furthermore, although it is described that the end portion of the first scanner 31 is moved onto the upper portion of the tray 42 in the current embodiment, the tray 42 can be formed on the second scanner 32, and the second scanner 32 can move on the x-y plane so that the tray 42 can be located under the end portion of the first scanner 31. Then, the first scanner 31 can move the end portion of the first scanner 31 in the z-axis direction, and accordingly, the spare probe (or the spare carrier to which the spare probe is attached) stored in the tray 42 can be attached onto the carrier holder 30 at the end portion of the first scanner 31.

According to the conventional SPM, when the replacement probe is attached onto the carrier holder portion, the position of the tip is changed whenever the probe is replaced, and thus, the positions of optical systems that are related to the probe must be rearranged after replacing the probe. However, according to the SPM of the current embodiment, the carrier holder 30, which has the protrusions 30a, is disposed on the end portion of the first scanner 31, and the carrier 20 that is attached to the carrier holder 30 also includes the holes 20a corresponding to the protrusions 30a of the carrier holder 30. Therefore, when the carrier 20, to which the probe 10 is attached, is attached onto the carrier holder 30, the protrusions 30a of the carrier holder 30 and the holes 20a of the carrier 20 are coupled to each other, and thus, the probe 10 can be attached on a predetermined position with regard to the carrier holder 30. Therefore, the problem of changing the positions of the tip whenever the probe is replaced and the optical systems relating to the probe as in the conventional SPM can be solved.

As a comparative example of the SPM with the current embodiment, an optical unit including an image pickup device such as a charge-coupled device (CCD) can be disposed in the SPM in order to determine whether the end portion of the first scanner 31 has exactly moved to the upper portion of the tray 42 (refer to FIG. 1). Then, the spare probe stored in the tray 42 can be attached to the carrier holder 30 at the end portion of the first scanner 31. The optical unit is installed because the relative position of the end portion of the first scanner 31 with respect to the tray 42 must be exact in order to attach the spare probe stored in the tray onto the carrier holder 30 at the end portion of the first scanner 31.

However, the SPM according to the current embodiment of the present invention does not require the optical unit as described above due to the fact that since the position of the tray 42 is set in advance, the end portion of the first scanner 31 simply moves to the peripheral portion of the tray 42, and then, the protrusions 30a of the carrier holder 30 and the holes 20a of the carrier 20 to which the probe 10 is attached have a function of automatic arrangement. That is, in the SPM of the current embodiment of the present invention, since the carrier holder 30 at the end portion of the first scanner 31 includes the protrusions 30a and the carrier 20 includes the holes 20a corresponding to the protrusions 30a, the protrusions 30a of the carrier holder 30 and the holes 20a of the carrier 20 are automatically coupled to each other when the probe 10 is attached to the carrier holder 30 even if the relative position of the first scanner 31 with respect to the tray 42 is not precise. As such, the probe 10 can be exactly attached onto the carrier holder 30.

To perform the function of automatic arrangement between the protrusions 30a of the carrier holder 30 and the holes 20a of the carrier 20, the protrusions 30a of the carrier holder 30 may have hemispherical shapes as shown in FIG. 2A. If the protrusions 30a of the carrier holder 30 are formed as hemispheres, the protrusions 30a of the carrier holder 30 can be slid into the holes 20a of the carrier 20 even when the positions of the protrusions 30a and the holes 20a do not coincide with each other. Then, the carrier to which the probe 10 is attached can be exactly attached to the carrier holder 30 automatically.

Meanwhile, although a plurality of protrusions 30a and a plurality of holes 20a can be formed, a proper attachment between the protrusions 30a of the carrier holder 30 and the holes 20a of the carrier 20 can be accomplished with at least only two protrusions 30a and two holes 20a.

In the SPM, according to the current embodiment of the present invention, the spare probe is stored in the tray 42. Additionally, unlike the conventional SPM, in which the probe is replaced manually by the user, the end portion of the first scanner 31 moves to the upper portion of the tray 42 so that the probe 10 can be automatically replaced as in the SPM of the current embodiment of the present invention, and thus, the convenience of using the SPM according to the present invention can be maximized.

Meanwhile, the position of the tray 42 that stores the spare probe is fixed. Therefore, when the user inputs a signal for replacing the probe 10 to the SPM, the end portion of the first scanner 31 can automatically move to the upper portion of the position of the tray 42 that is set in advance. Otherwise, the tray 42 can be formed on the second scanner 32 and the second scanner 32 moves in a predetermined path on the x-y plane so that the tray 42 can be located under the end portion of the first scanner 31. Hence, when the probe 10 is automatically replaced, the position of the probe 10 with respect to the carrier holder 30 at the end portion of the first scanner 31 may not be exactly arranged. However, according to the SPM of the current embodiment, the probe 10 can be automatically attached onto the exact location of the carrier holder 30 due to the protrusions 30a formed on the carrier holder 30 and the holes 20a formed in the carrier 20.

Figure 3A:
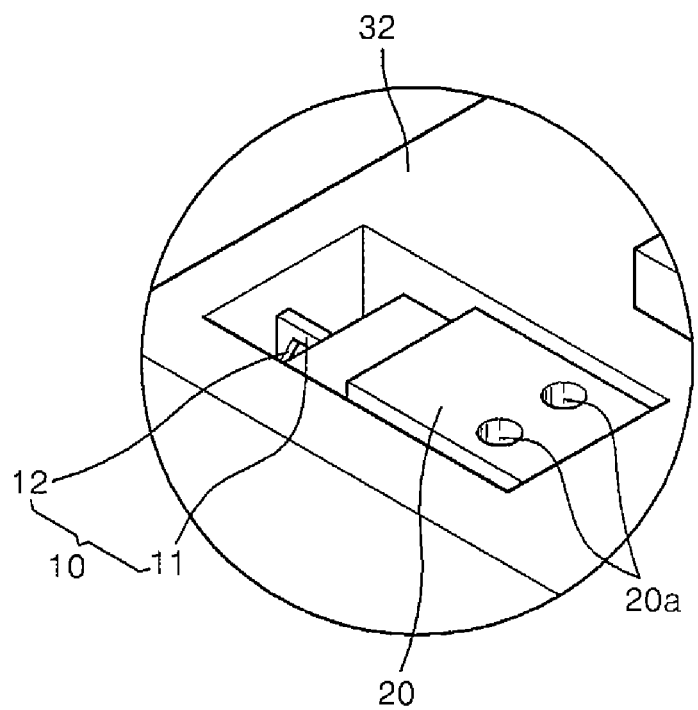
FIG. 3A is a schematic perspective view of portion B of FIG. 1, in which a carrier and a probe that is adhered to the carrier are stored in a tray, according to an embodiment of the present invention.

FIG. 3A is a schematic perspective view of portion B in FIG. 1, in which the carrier 20 and the probe 10, which is attached onto the carrier 20, are stored, according to an embodiment of the present invention. The spare probe that is to be attached onto the carrier holder 30 of the first scanner 31 is stored in the tray 42. A plurality of probes can be stored in the tray 42 unlike the example shown in FIG. 3A.

Figure 3B:
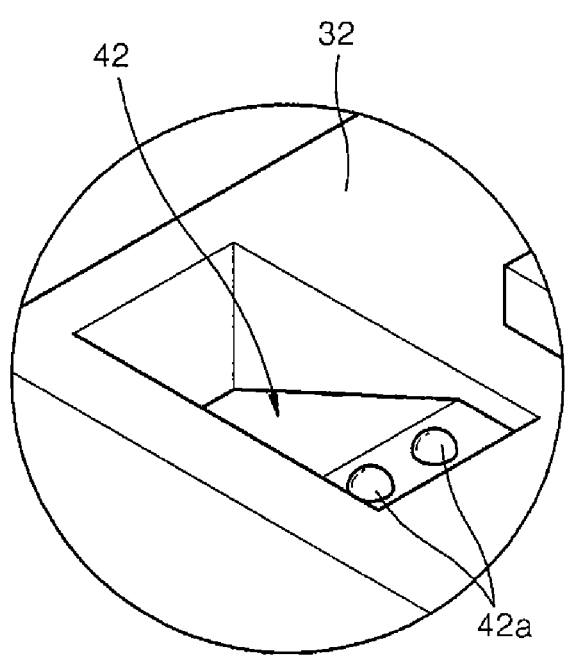
FIG. 3B is a perspective view of the tray shown in portion B of FIG. 1, in which a carrier and a probe that is attached to the carrier are not stored in a tray, according to an embodiment of the present invention.

FIG. 3B is a perspective view of a tray 42 as shown in portion B of FIG. 1, in which the carrier 20 and the probe 10, which is attached onto the carrier 20, are not stored in the tray 42, according to the embodiment of the present invention. Referring to FIG. 3B, the tray 42 includes a plurality of protrusions 42a. Thus, the carrier 20, to which the probe 10 is attached, stored in the tray 42 includes a plurality of holes or a plurality of recesses (hereinafter, referred to as holes) corresponding to the protrusions 42a of the tray 42. Therefore, when the carrier 20, to which the probe 10 is attached, is stored in the tray 42, the carrier 20 can be located at a fixed location in the tray 42.

The effects of the SPM according to the current embodiment are as follows. If the size of the tray 42 is equal to that of the probe 10 or the carrier 20 to which the probe 10 is attached, it is not easy to insert the probe 10 or the carrier 20 into the tray 42 or draw the probe 10 or the carrier 20 from the tray 42. Therefore, the tray 42 may be larger than the probe 10 or the carrier 20. However, if the tray 42 is larger than the probe 10 or the carrier 20, the probe 10 or the carrier 20 may not be stored at a fixed location in the tray 42. Then, when the probe 10 or the carrier 20, which is stored in the tray 42, is automatically attached to the carrier holder 30 at the end portion of the first scanner 31, the relative positions between the probe 10 or the carrier 20 in the tray 42 and the carrier holder 30 at the end portion of the first scanner 31 are not consistent with each other.

However, according to the SPM of the current embodiment, the protrusions 42a are formed in the tray 42, and the carrier 20, to which the probe 10 is attached, has the holes 20a corresponding to the protrusions 42a of the tray 42, and thus, the position of the probe 10 in the tray 42 can be fixed. Consequently, the probe 10 or the carrier 20, which is stored in the tray 42, can be exactly attached to the carrier holder 30 at the end portion of the first scanner 31.

Meanwhile, the carrier 20, to which the probe 10 is attached, includes the holes 20a corresponding to the protrusions 30a formed on the carrier holder 30 at the end portion of the first scanner 31, and thus, the holes 20a formed in the carrier 20 can correspond to both of the protrusions 30a and the protrusions 42a by forming the protrusions 42a formed in the tray 42 to have the same patterns as those of the protrusions 30a of the carrier holder 30. Furthermore, in order to stably store the probe 10 or the carrier 20 in the tray 42, the carrier 20 can be formed of a metal material and the tray 42 can be formed of a permanent magnet or an electromagnet, or the tray 42 can include a portion formed of a permanent magnet or an electromagnet. For example, the protrusions 42a of the tray 42 can be formed of a permanent magnet or an electromagnet. If the tray 42 is formed of a permanent magnet or includes a portion formed of a permanent magnet, the carrier holder 30 at the end portion of the first scanner 31 can be formed of a permanent magnet having a stronger magnetic force than that of the permanent magnet of the tray 42, and thus, the probe 10, which is stored in the tray 42, can be attached onto the carrier holder 30.

Figure 4:
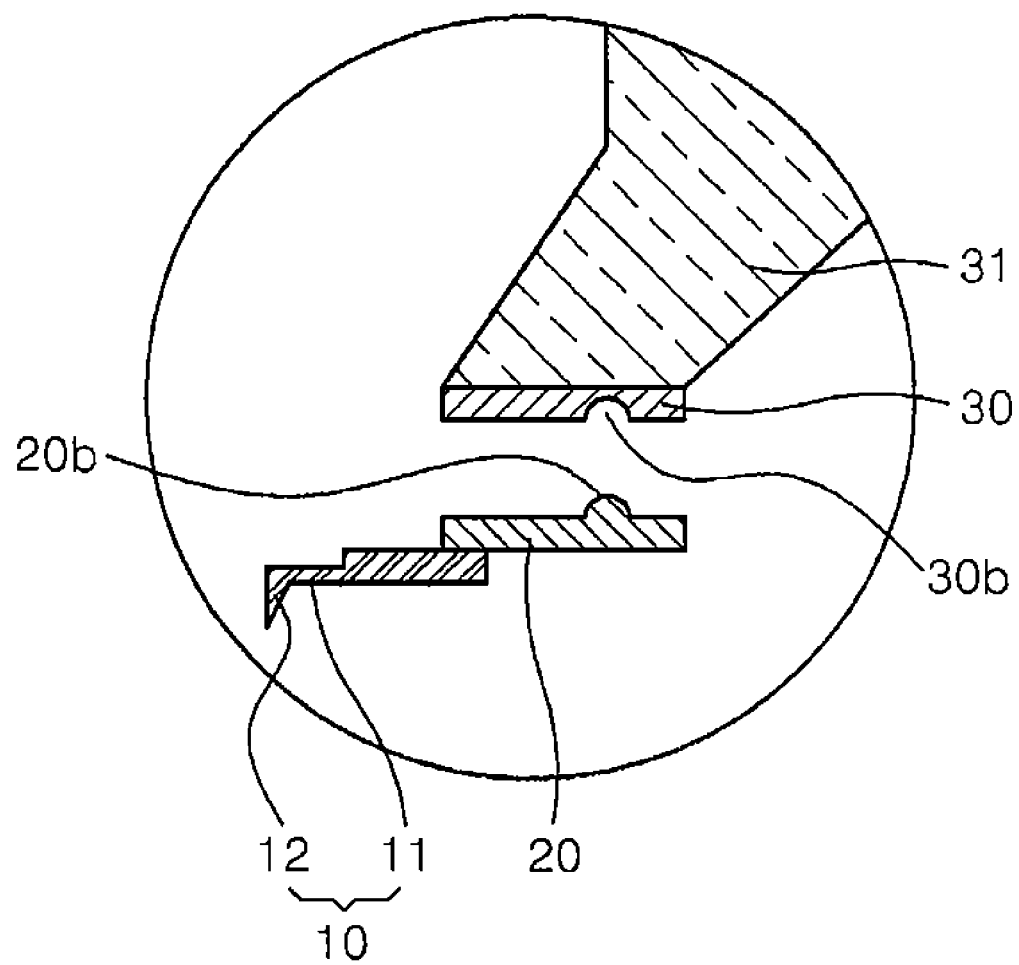
FIG. 4 is a cross-sectional view of a part of an SPM according to another embodiment of the present invention.

FIG. 4 is a cross-sectional view of a part of an SPM according to another embodiment of the present invention. In the SPM according to the previous embodiment, the of protrusions 30a are formed on the carrier holder 30 at the end portion of the first scanner 31, and the carrier 20, to which the probe 10 is attached, includes the holes 20a or recesses corresponding to the protrusions 30a of the carrier holder 30. However, in the SPM according to the current embodiment, a plurality of recesses 30b are formed on the carrier holder 30 at the end portion of the first scanner 31, and a plurality of protrusions 20b, which correspond to the recesses 30b of the carrier holder 30, are formed on the carrier 20, to which the probe 10 is attached. According to the above structure, the probe 10 can be attached to the exact position of the carrier holder 30. The above structure can be modified variously, for example, a plurality of protrusions are formed on a lower surface of the carrier to which the probe is attached, and a plurality of recesses, which correspond to the protrusions of the carrier, are formed in the tray, and thus, the probe can be stored at the fixed location in the tray.

According to the SPM of the present invention, the probe can be automatically replaced, and the replacement probe can be attached onto an exact position.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A scanning probe microscope (SPM) comprising:
a first scanner that has a probe carrier holder, and changes a position of the probe carrier holder along a straight line;

a second scanner that is decoupled from the first scanner and changes a position of a sample within a plane; and a tray configured to store a spare probe carrier and a spare probe attached to the spare probe carrier, wherein the probe carrier holder includes a plurality of protrusions that are configured for engagement with corresponding holes formed on the spare probe carrier.

2. The SPM of claim 1, further comprising:

a probe carrier and a probe attached to the probe carrier, wherein the probe carrier can be attached to the probe carrier holder and detached from the probe carrier holder, and includes a plurality of holes corresponding to the protrusions of the probe carrier holder.

3. The SPM of claim 2, wherein the probe carrier is formed of metal.

4. The SPM of claim 1, wherein the tray includes a plurality of protrusions.

5. The SPM of claim 4, further comprising:

a probe carrier and a probe attached to the probe carrier, wherein the probe carrier can be attached to the probe carrier holder and detached from the probe carrier holder, and includes a plurality of holes corresponding to the protrusions of the probe carrier holder and to the protrusions of the tray.

6. The SPM of claim 4, wherein the probe carrier is formed of metal.

7. The SPM of claim 1, wherein the probe carrier holder is formed of a permanent magnet or an electromagnet, includes a portion formed of a permanent magnet or an electromagnet, or includes a vacuum chuck.

8. The SPM of claim 1, wherein the tray is formed of a permanent magnet or an electromagnet, or includes a portion formed of a permanent magnet or an electromagnet.

9. The SPM of claim 1, wherein the probe carrier holder includes three protrusions that are hemispherical.

10. A scanning probe microscope (SPM) comprising:

a first scanner that has a probe carrier holder, and changes a position of the probe carrier holder along a straight line;

a second scanner that is decoupled from the first scanner and changes a position of a sample within a plane; and a tray configured to store a spare probe carrier and a spare probe attached to the spare probe carrier, wherein the probe carrier holder includes a plurality of protrusions that are configured for engagement with corresponding recesses formed on the spare probe carrier.

11. The SPM of claim 10, further comprising:

a probe carrier and a probe attached to the probe carrier, wherein the probe carrier can be attached to the probe carrier holder and detached from the probe carrier holder, and includes a plurality of recesses corresponding to the protrusions of the probe carrier holder.

12. The SPM of claim 11, wherein the probe carrier is formed of metal.

13. The SPM of claim 10, wherein the tray includes a plurality of protrusions.

14. The SPM of claim 13, further comprising:

a probe carrier and a probe attached to the probe carrier, wherein the probe carrier can be attached to the probe carrier holder and detached from the probe carrier holder, and includes a plurality of recesses corresponding to the protrusions of the probe carrier holder and to the protrusions of the tray.

15. The SPM of claim 13, wherein the probe carrier is formed of metal.

16. The SPM of claim 10, wherein the probe carrier holder is formed of a permanent magnet or an electromagnet, includes a portion formed of a permanent magnet or an electromagnet, or includes a vacuum chuck.

17. The SPM of claim 10, wherein the tray is formed of a permanent magnet or an electromagnet, or includes a portion formed of a permanent magnet or an electromagnet.

18. The SPM of claim 10, wherein the probe carrier holder includes three protrusions that are hemispherical.

19. A scanning probe microscope (SPM) comprising:

a tray configured to store a plurality of probe carriers, a first scanner that changes a position of a probe carrier that is attached thereto along a straight line;

a second scanner that is decoupled from the first scanner and changes a position of a sample within a plane; and wherein the probe carriers each have female engagement portions that are configured to mate with male engagement portions disposed on the first scanner and the tray.

20. The SPM of claim 19, wherein the female engagement portions are holes or recesses and the male engagement portions are hemispherical projections.

* * * * *